United States Patent Office 3,493,541
Patented Feb. 3, 1970

3,493,541
AROMATIC POLYBENZIMIDAZOLINE RESINS
Walter G. Gall, Wilmington, Del., assignor to E. I. du Pont de Nemours and Company, Wilmington, Del., a corporation of Delaware
No Drawing. Continuation-in-part of application Ser. No. 450,202, Apr. 22, 1965. This application Sept. 23, 1968, Ser. No. 761,868
Int. Cl. C08g 33/02
U.S. Cl. 260—72.5    3 Claims

ABSTRACT OF THE DISCLOSURE

Aromatic polybenzimidazoline resins having recurring structural units of the structure

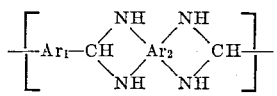

wherein $Ar_1$ is

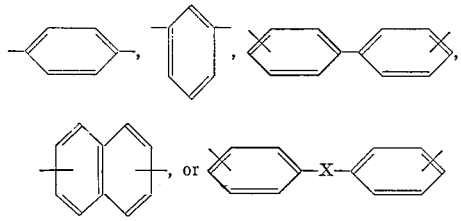

where X is —O—, —S—, —CO—, —SO$_2$— or an alkylene group of from 1 to 3 carbon atoms, and wherein $Ar_2$ is

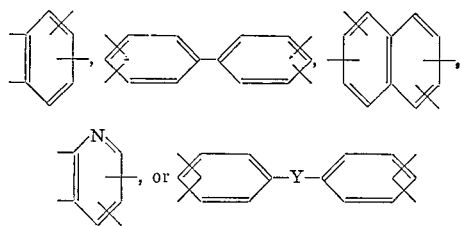

wherein Y is —O—, —S—, —CO—, —SO$_2$—, alkylene groups of from 1 to 3 carbon atoms, or

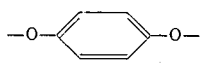

and wherein the bonds shown in the group defining $Ar_2$ are arranged in pairs ortho to each other, and wherein each of $Ar_1$ and $Ar_2$ can contain up to two substituents selected from the group consisting of lower alkyl, lower alkoxy, and halogen. The resins are prepared by heating in an inert solvent in the substantial absence of oxygen at between 100 and 250° C. at least one aromatic tetraamine of the formula $(H_2N)_2Ar_2(NH_2)$ wherein $Ar_1$ and $Ar_2$ have the meanings given above.

CROSS REFERENCE TO RELATED APPLICATION

This application is a continuation-in-part of U.S. application Ser. No. 450,202, filed Apr. 22, 1965, by Walter G. Gall, now abandoned.

BACKGROUND OF THE INVENTION

This invention relates to aldehyde-amine condensation polymers and their preparation. More particularly, it relates to aromatic polybenzimidazolines and their preparation.

A few aldehyde-amine condensation products have been prepared, as for example. B. E. Davydov et al., Vysokomolek, Soed, 5, 321 (1963); B. E. Davydov et al., Bull. Academy of Sciences, USSR, Chem. Div., April 1963, pp. 682–684; and A. V. Topchiev et al., J. Polymer Science, Part C, No. 4, 1305 (1963). However, their molecular weights correspond to tri- and tetramers and their low melting points make them impracticable for high-temperature plastic uses. Aldehyde-amine condensation products of high molecular weight and melting point have not hitherto been prepared.

Correspondingly, it is an object of this invention to provde for aromatic polybenzimidazolines having high molecular weights and melting points. Another object is to provide a process for preparing the polymers. These and other objects will become apparent hereinafter.

SUMMARY OF THE INVENTION

The objects of this invention are accomplished by providing aromatic polybenzimidazoline resins having recurring structural units of the formula (1) 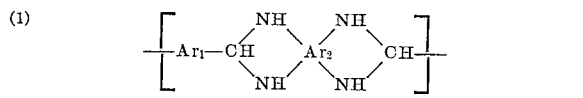

wherein $Ar_1$ is a divalent aromatic group of the structure

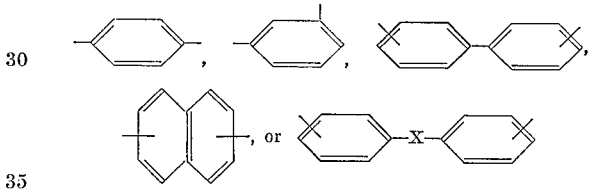

in which X is —O—, —S—, —CO—, —SO$_2$— or alkylene of 1 to 3 carbon atoms; $Ar_2$ is a tetravalent aromatic group of the structure

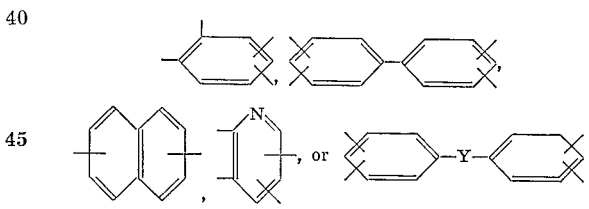

in which Y is —O—, —S—, —CO—, —SO$_2$—, alkylene of 1 to 3 carbon atoms or

in which the bonds are in ortho pairs. The foregoing aromatic groups may contain up to two substituents which are non-reactive in an aldehyde-amine condensation reaction. Such substituents include lower alkyl, e.g., methyl, ethyl, propyl, and hexyl; lower alkoxy, e.g., methoxy, ethoxy and hexoxy; and halogen, e.g., fluorine, chlorine, bromine and iodine. Preferably, however, the Ar groups are unsubstituted.

The polybenzimidazoline resins of this invention are characterized by good thermal stability and toughness. They have inherent viscosities of 0.2 and up as measured on 0.5% solutions in concentrated sulfuric acid at 30° C. In fact, some of the polymers have molecular weights sufficiently high to make them insoluble, or partially insoluble in the sulfuric acid.

The polymeric resins of this invention are obtained by reacting in the substantial absence of oxgyen and preferably at reflux temperatures, at least one aromatic tetraamine of the formula (2)         $(H_2N)_2—Ar_2—(NH_2)_2$ wherein the amino groups are in pairs ortho to each other, with at least one aromatic dialdehyde of the formula (3)         $OHC—Ar_1—CHO$ in a solvent inert to the reactants and products. Such solvents include ethers such as tetrahydrofuran, glyme, and the like; and carboxylic amides such as N-alkyl- and N,N-dialkylamides. Because the polymeric products are insoluble in the latter two classes of reaction solvents, they constitute a preferred class. These preferred amides are represented by the formulae RCONHR′ and RCONR′R″ where R′ and R″ are each alkyl, (preferably of 1 to 8 carbon atoms) and R is hydrogen, alkyl, (preferably of 1 to 8 carbon atoms) or aryl (preferably of 6 to 12 carbon atoms).

The reaction is conveniently carried out by mixing the aromatic amine and aldehyde reactants in the solvent and heating to reflux. Pressure is not critical and generally atmospheric pressures are employed, although sub- or super-atmospheric pressures may be used. The refluxing solvent serves to eliminate oxygen from the systems. Reflux temperatures are preferred, and these, of course, will depend upon the solvent employed. Generally, the temperature will lie between 100–250° C., and preferably between 150–200° C. Substantially, equivalent amounts of the reactants are employed. Reaction time is not critical and may range from a few minutes, or even seconds to 8 hours or more depending upon the temperature and other conditions selected. The polymeric resin forms as the temperature approaches reflux temperature, and the resin may be obtained conveniently by filtration from the carboxylic amide reaction solution.

To obtain the polybenzimidazolines, a tetraamine of Formula 2 is reacted with the aldehyde of Formula 3. The initial reaction product is the diamino-substituted polyimine

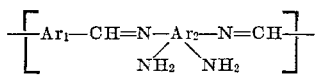

which undergoes further reaction to result in the polymer of Formula 1.

Two or more aromatic amines or two or more aromatic aldehydes may be employed in the process to obtain copolymers. Such polymers are included in, and are a part of, this invention.

The polymeric resins can be worked up by conventional techniques, e.g., washing with acetone and drying. The drying is generally carried out in vacuo at temperatures of 40–60° C.

The resinous powder is a plastic which can be fabricated into a variety of molded shapes. The fabricating conditions will depend upon the nature of the Ar groups. In general, upon subjecting the resins of this invention to temperatures of 275–450° C. with a pressure of about 10,000 p.s.i., a strong, stiff object is obtained. Thus, the polymers of this invention are useful in the preparation of shaped plastic articles such as water containers, decorative designs, and the like.

The combination of high melting points and high thermal stability of the polymers allow them to be employed in high-temperature applications; for in general, decomposition does not begin to take place until temperatures of about 400° C. are reached.

The monomers employed in preparing the novel polymers are all well-known materials. Examples of dialdehydes of Formula 3 which can be employed include terephthalaldehyde, isophthalaldehyde, bibenzyl - 4,4′ - dicarboxaldehyde, bibenzyl - 3,3′ - dicarboxaldehyde, bibenzyl-3,4′-dicarboxaldehyde, biphenyl - 4,4′ - dicarboxaldehyde, biphenyl - 3,3′ - dicarboxaldehyde, biphenyl-2,2′ - dicarboxaldehyde, biphenyl - 2,3′ - dicarboxaldehyde, biphenyl - 2,4′ - dicarboxaldehyde, biphenyl - 3,4′-dicarboxaldehyde, naphthalene - 1,4 - dicarboxaldehyde, naphthalene - 1,5 - dicarboxaldehyde, naphthalene - 1,8-dicarboxaldehyde, naphthalene - 2,6 - dicarboxaldehyde, naphthalene - 1,7 - dicarboxaldehyde, naphthalene - 2,7-dicarboxaldehyde, diphenylether - 4,4′ - dicarboxaldehyde, diphenylsulfide - 4,4′ - dicarboxaldehyde, diphenylsulfone-4,4′ - dicarboxaldehyde, diphenylether - 3,3′ - dicarboxaldehyde, diphenylsulfide - 3,3′ - dicarboxaldehyde, diphenylsulfone - 3,3′ - dicarboxaldehyde, diphenylmethane-4,4′-dicarboxaldehyde, diphenylmethane - 3,3′ - dicarboxaldehyde, benzophenone - 4,4′ - dicarboxaldehyde, benzophenone - 3,3′ - dicarboxaldehyde, benzophenone - 3,4′-dicarboxaldehyde, 2,2 - bis(4 - carboxaldehydophenyl) propane, 2,2 - bis(3 - carboxaldehydophenyl) propane, and the like. Examples of the tetraamines employed as a reactant include 1,2,4,5-tetraaminobenzene, 3,3′,4,4′ - tetraaminodiphenylether, 1,2,5,6 - tetraaminonaphthalene, 2,2-bis(3,4 diaminophenyl)propane, 1,4 - bis(3,4 diaminophenoxy)benzene, and the like.

The strength factor of the polymers in the following examples is a measurement of the force in p.s.i. required to break a uniform chip of the polymer divided by the thickness of the chip in mils. This measurement is determined by placing a test specimen across a circular support having an $\tfrac{11}{16}$ in. slot located therein. The test specimen is loaded by a triangular cross section bar slightly longer than the diameter of the test specimen with the contact edge having a radius of $\tfrac{1}{32}$ in. The load is applied slowly until the specimen fails and breaks. The bar is driven by a 4 in. diameter air clamp.

The thermal stability of the polymers in the examples was determined using a calibrated spring balance having a pan containing a small sample of the polymer suspended in a furnace. The system was maintained under nitrogen. At 450° C., a small fraction evaporates rapidly, which is likely solvent entrapped within the polymer. The degradation rate of the remainder of the polymer is then determined.

DESCRIPTION OF THE PREFERRED EMBODIMENTS

Example 1

A stirred solution of 3,3-diaminobenzidine (0.05 mole) in N,N-dimethylacetamide (100 ml.) is treated with terephthalaldehyde (0.05 mole) and the mixture is heated rapidly to boiling. As the boiling point is reached, a brick red polybenzimidazoline powder is formed. After the suspension is heated under reflux for 15 minutes, the polymer is filtered off and washed twice with acetone followed by vacuum drying at 50° C. The product is heat treated overnight at 275° C. under nitrogen to yield an orange powder. The polymer is insoluble in concentrated sulfuric acid. Fabrication of the polymer is carried out at 350° C. using 10,000 p.s.i. for 5 minutes, resulting in a strong, stiff, orange colored chip. Its strength factor was found to be 0.18 after an initial loss of a volatile fraction of about 4%, the rate of degradation at 450° C. under nitrogen is $3.6 \times 10^{-4}$ min.$^{-1}$.

Example 2

The procedure of Example 1 is used to prepare a polybenzimidazoline from 3,3-diaminobenzidine and bibenzyl-4,4′-dicarboxyaldehyde. The yellow powder is partially soluble in concentrated sulfuric acid, forming a purple solution. Fabrication is at 275° C. and 5000 p.s.i., resulting in a yellow-brown chip with a strength factor of 0.13.

I claim:
1. A polybenzimidazoline resin having an inherent viscosity of at least 0.2 as measured on a 0.5 percent solution in concentrated sulfuric acid at 30° C. which resin consists essentially of recurring units of the structure

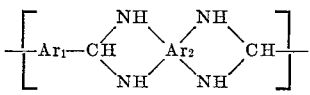

wherein $Ar_1$ is selected from the group consisting of

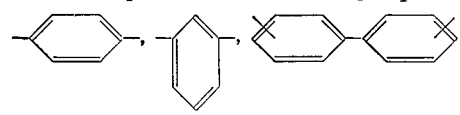

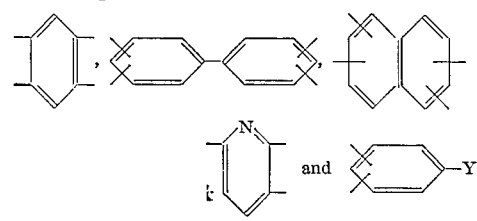

wherein X is selected from the group consisting of —O—, —S—, —CO—, —SO$_2$—, and alkylene radicals of from 1 to 3 carbon atoms, and $Ar_2$ is selected from the group consisting of

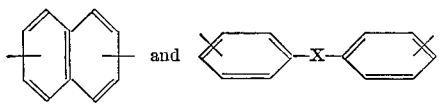

wherein Y is selected from the class consisting of —O—, —S—, —CO—, —SO$_2$—, alkylene radicals of from 1 to 3 carbon atoms, wherein the bonds are in pairs ortho to each other, and wherein each of $Ar_1$ and $Ar_2$ can contain up to two substituents selected from the group consisting of lower alkyl, lower alkoxy, and halogen.

2. The polybenzimidazoline resin of claim 1 wherein $Ar_1$ is

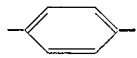

and $Ar_2$ is

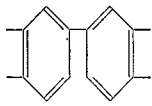

3. The polybenzimidazoline resin of claim 1 wherein $Ar_1$ is

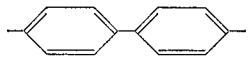

and $Ar_2$ is

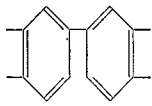

References Cited

Chem. Abstracts, vol. 61, 1964, Adrova et al., 13435 b–c, effective date June 1964.

WILLIAM H. SHORT Primary Examiner

HOWARD SCHAIN, Assistant Examiner

U.S. Cl. X.R.

260—47, 52, 64, 65